No. 636,484. Patented Nov. 7, 1899.
J. A. BRILL.
CAR TRUCK.
(Application filed Sept. 11, 1897.)

(No Model.) 3 Sheets—Sheet 1.

WITNESSES
C. M. Benjamin
Wm Jacobsen

INVENTOR
John A. Brill,
BY
Joseph R. Levy
ATTORNEY

THE NORRIS PETERS CO., PHOTO-LITHO., WASHINGTON, D. C.

No. 636,484. Patented Nov. 7, 1899.
J. A. BRILL.
CAR TRUCK.
(Application filed Sept. 11, 1897.)

(No Model.) 3 Sheets—Sheet 2.

Attest:
C. W. Benjamin
Wm Jacobsen.

INVENTOR
John A. Brill.
BY
Joseph L. Levy
ATTORNEY

No. 636,484. Patented Nov. 7, 1899.
J. A. BRILL.
CAR TRUCK.
(Application filed Sept. 11, 1897.)
(No Model.) 3 Sheets—Sheet 3.
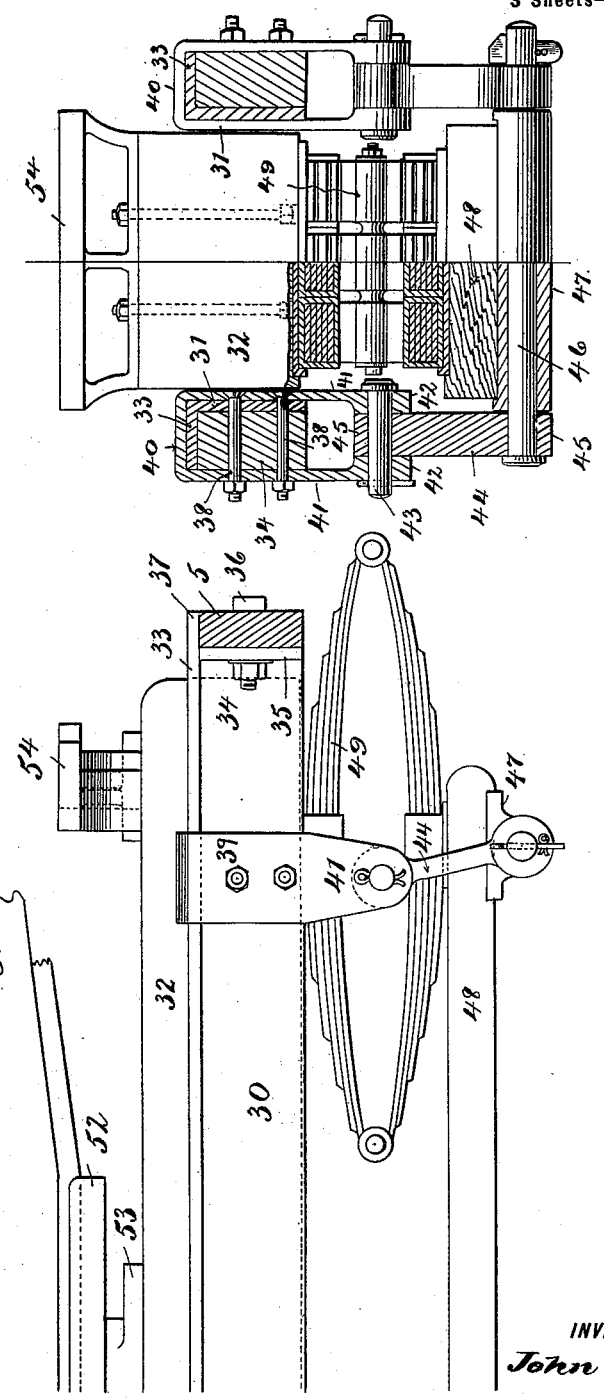
WITNESSES
INVENTOR
John A. Brill.
BY
ATTORNEY

UNITED STATES PATENT OFFICE.

JOHN A. BRILL, OF PHILADELPHIA, PENNSYLVANIA.

CAR-TRUCK.

SPECIFICATION forming part of Letters Patent No. 636,484, dated November 7, 1899.

Application filed September 11, 1897. Serial No. 651,342. (No model.)

*To all whom it may concern:*

Be it known that I, JOHN A. BRILL, a citizen of the United States, residing at Philadelphia, county of Philadelphia, and State of Pennsylvania, have made certain new and useful Improvements in Car-Trucks, of which the following is a specification.

My invention has special relation to pivotal trucks employed in passenger service wherein an electric motor or other equivalent means are employed for the purpose of propulsion, although the improvements hereinafter recited are equally capable of employment in trucks designed for other services.

My improvements, apart from the details of specific construction hereinafter recited, reside in the combination, with the truck, of equalizing-bars for supporting the truck-frame, the equalizing-bars being detachably supported by the axle-boxes below the axles and parallel with the side bars of the truck-frame as distinguished from supporting the equalizing-bars on top of the axle-boxes or the axle-box pedestals, as in prior constructions, each of the equalizing-bars lying in the same horizontal plane, where they engage the axle-boxes and support the truck-springs, as distinguished from the gooseneck formation of equalizing-bars heretofore employed, by means of which the construction of the truck is made more economical and the equalizing-springs can be placed much closer to the axle-box pedestals to give a more extensive spring-base for the truck-frame on the equalizing-bars, thereby insuring an easier-riding truck and a more efficient resistance to the elevation of the truck during braking and the like.

My invention also embodies certain other details of construction hereinafter described and finally pointed out in the claims.

Figure 1:
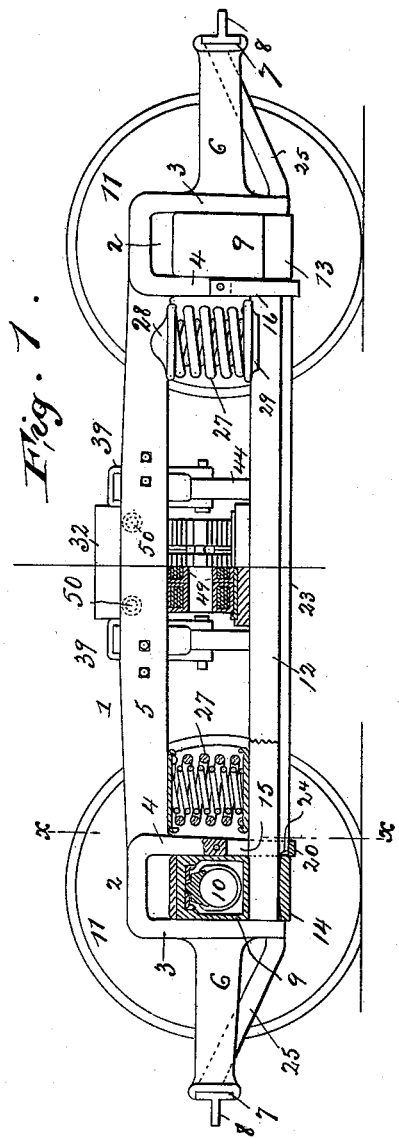
Figure 2:
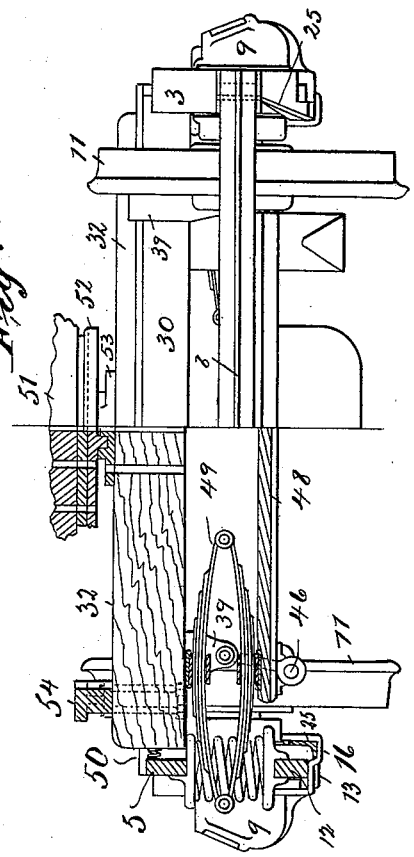
Figure 3:
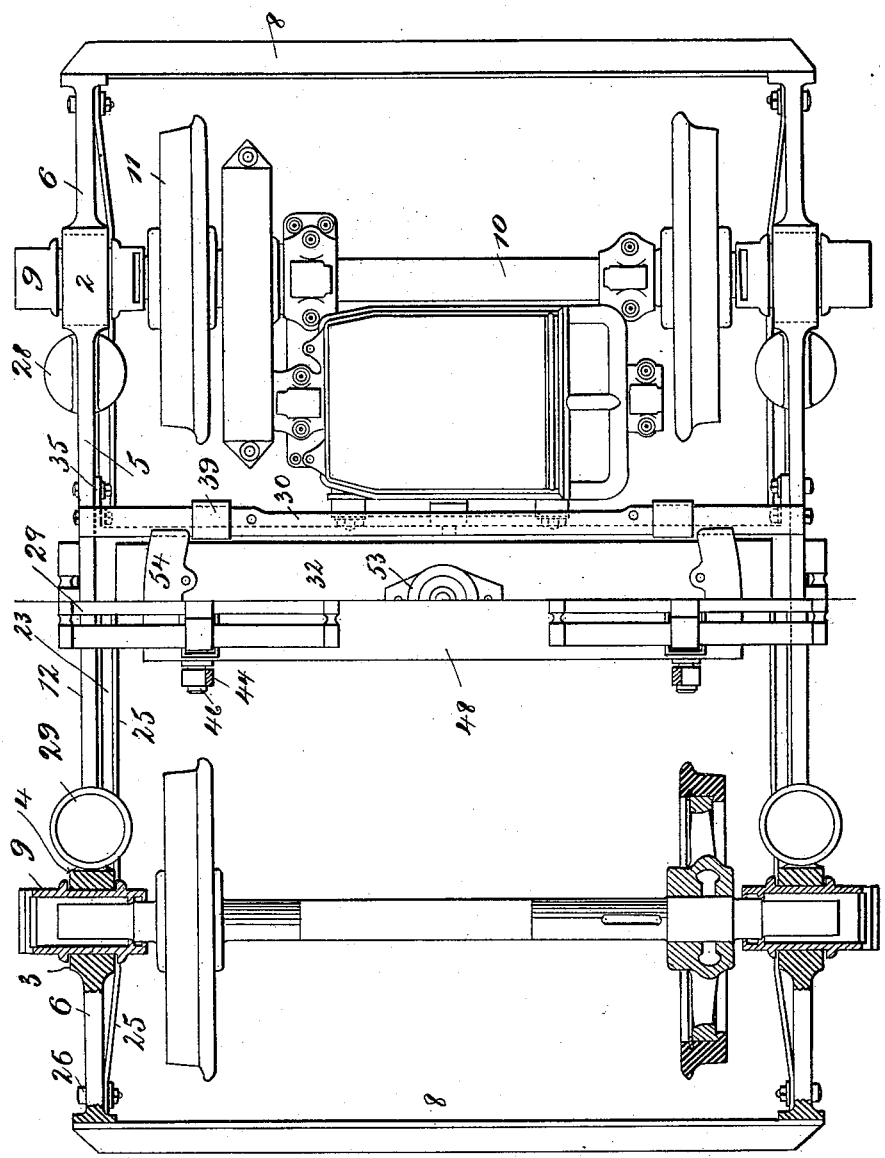

In the drawings forming part of this specification, Figure 1 is a side elevation of the truck embodying my improvements, partly in section; Fig. 2, an end elevation, one-half of which is in sectional elevation, taken transversely through the truck-center; Fig. 3, a plan view, partly in section; Fig. 4, an enlarged fragmentary view showing the bolster construction; Fig. 5, an enlarged end elevation, Fig. 4, partly in section; and Fig. 6, an enlarged end elevation, partly in section, substantially on the line $x\ x$, Fig. 1.

In the drawings similar numerals of reference indicate corresponding parts throughout the several views.

In carrying out my improvements I employ a truck-frame of the usual or desired construction, the one here described comprising the side frames 1, composed of the inverted-U-shaped axle-box pedestals or yokes 2, having inner and outer depending arms 3 4, the side bar 5, connecting the yokes at the top, and central extensions 6, to which are secured in depressions 7, formed in the ends of the extensions, angle-iron cross-bars 8, which unite the side frames into a single truck-frame.

At 9 are the axle-boxes, 10 the axles, and 11 the wheels, all of usual construction, the axle-boxes being embraced by the members or arms 3 4 of the yokes.

At 12 are the equalizing-bars, which are shown as rectangular bars, preferably of about the same dimension in cross-section as the side bars to insure strength, which equalizing-bars, as shown, are supported at their ends in rectangular depending lugs 13, preferably formed integrally with the axle-boxes, the ends of the equalizing-bars resting on the cross-plates 14, which are preferably slightly curved, as shown, and abutting against the yoke-arms 3, which are preferably made solid. The cross-plates 14 are curved on their upper faces, so that if one of the axles-boxes 9 rises higher or falls lower than the other the equalizing-bars 12 will have a limited play.

Figure 6:
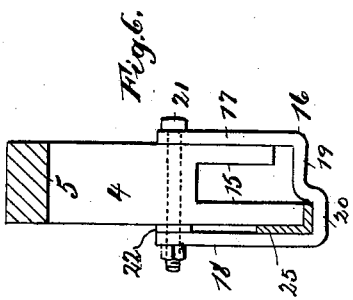

In order to allow of the yoke-arms 4 being passed over or raised from the equalizing-bars, the said arms are provided with a slot 15, as shown in Fig. 6, through which slot the equalizing-bars pass. The slots further allow for play of the yokes up and down about the equalizing-bars. In order to strengthen the inner arms 4 of the yokes at the place where they are slotted, I have provided straps 16, which have upwardly-extending arms 17 18, the lower cross-bar 19 of which is stepped, as at 20, the arms 17 18 being solidly connected to the yoke-arms 4 by a bolt 21, which passes through the solid part of the yoke and the ends of the strap, the bolt being provided with a nut and a head for securement, and between the inner arm of the strap and the yoke member is a spacing-block 22, through which the bolt passes, the block separating the inner strap-arm 18 from the yoke-arm 4 to provide a space between the parts.

Extending between the pedestals is the pedestal tie-bar 23, which consists of a bar of angle-iron, the angle of which rests in the stepped portion of the strap and is held between the strap at that point and the side of the yoke-arm, as shown clearly in Fig. 6. At the point where said tie-bar passes toward the end of the truck-frame the lower web is removed, as shown at 24, Fig. 1, the upright web 25 being continued across the yoke-arms in the same plane and thence upwardly to the frame extensions 6, where it is secured by the bolts 26, as shown in Fig. 3. This construction provides a safety strapping for the slotted yoke-arm and an efficient support for the pedestal tie-bar and allows of an expeditious dismemberment of the yokes from the equalizing-bar and the removal of the pedestal tie-bar when it is desired to raise or jack the truck up to remove the axle-boxes and wheels.

At 27 are the equalizing or car springs, supported upon the equalizing-bars close to the inner arm 4 of the yokes.

As will be noticed, the upper and lower spring caps and cups 28 29, between which said springs extend, lie exceedingly close to the yokes—in fact, almost abutting against them.

Where the gooseneck-end form of equalizing-bar has been employed, the equalizing-springs have been located some distance from the pedestals—in fact, closer to the transverse center of the truck than to the pedestals, or at least a considerable distance away therefrom. The placing of these springs close up to the axle-boxes I consider a valuable feature for the reasons hereinbefore set forth, and I am enabled to produce by paralleling the equalizing-bars with the top chord, side bar, or other upper element of the side frame and by forming the equalizing-bars of a straight piece of metal, especially at their ends, and supporting or hanging them from the axle-boxes below the axle a very low-placed car-body, as the truck-frame can be hung low and a low suspension of the bolster obtained thereby.

As will be seen by reference to Fig. 1, the equalizing or truck springs come in direct contact with the side bars 5 of the truck-frame and support it.

To the side bars are secured a pair of transversely-extending transoms 30, and from the transoms are hung links supporting a spring-plank, upon which and between the transoms is supported the bolster by springs, and on the bolster are secured center and side bearings of any desired construction. I make no claim to these parts broadly, as they are not of my invention; but in certain details I have made improvements, which I shall now describe.

The transoms comprise inverted-L-shaped bars or angle-irons, their upright webs 31 being placed to face the bolster 32, which lies between them, the horizontal webs 33 extending from the bolster toward each end of the truck, and within the angle formed by these webs is placed a filling-block 34, of wood or other desired material, lying flush with the ends of the transom-webs. The upright web 31 of the transoms at their ends is severed from the horizontal web and bent at right angles to form the lips 35, through which and the side bar pass bolts 36 for securing the ends of the transoms to the side bars, the extensions 37 of the horizontal webs 33 thus formed continuing over the side bars 5 and resting thereon to relieve the bolts of the shearing strain, as clearly shown in Fig. 4.

Fixedly secured to the transoms by bolts 38, passing through the upright web 31 and block- ing 34 thereof, are inverted-U-shaped straps 39, the cross-bar 40 of which passes over the top of the transoms and has arms 41 depending from each side thereof, lugs 42 being formed on the inner sides of the perpendicular arms of the straps, the lugs being apertured to form eyes for the reception of pivot-pins 43, as shown in Fig. 5, and from the pivot-pins depend link-hangers 44, having eyes 45 formed for the passage of the link-pins 43 at the top and a transverse plank-pin 46 at the bottom extending between the hangers on each side, one of the pins being provided with an enlarged head and the other with a cotter, forming an articulated connection between the transoms and the lower portion of the link-hangers, the pin 46 passing through a casting 47, on which rests the spring or sand plank 48, and on the sand-plank are secured the elliptic springs 49, which support the bolster in the usual manner.

Between the ends of the bolster and the side bars may extend small spiral springs 50 to ease off the transverse throw or swing of the bolster.

At 51 is shown a portion of the body-bolster, and at 52 a body-center bearing resting upon the truck-center bearing 53, fast to the bolster, and at 54 are indicated the side bearings, all of which, including the construction of the bolster and the parts not hereinafter specifically claimed, can be of any other or desired construction.

Having described my invention, I claim—

1. In a car-truck, the combination with the axle-boxes having fixed lugs with a lateral cross-plate having a curved upper face, said lugs depending below the axle-opening of the box, slots extending transversely through the lugs below the axle proper, equalizing-bars extending between the slots in the lugs below the axles and resting on the cross-plates, springs on the equalizing-bars, and a truck-frame supported by said springs, substantially as described.

2. In a car-truck, a frame having axle-box yokes or pedestals, axle-boxes in the pedestals, equalizing-bars passing through slots in said pedestals and supported by cross-plates having curved upper faces and forming part of integral lugs depending from the axle-boxes below the axles, springs on the equalizing-bars, and a truck-frame supported by said springs, substantially as described.

3. In a car-truck, the combination with the axle-boxes having transversely-slotted lugs or housings depending therefrom, the lugs having lateral cross-plates having curved upper faces, and equalizing-bars removably extending between the boxes, and resting on said cross-plates, a truck-frame having axle-box yokes embracing the sides of the boxes, springs on the equalizing-bars, the truck-frame resting on said springs, substantially as described.

4. In a car-truck, the combination with the truck-frame having axle-box yokes or pedestals, axle-boxes in the yokes, transversely slotted having curved upper faces and integral lugs having lateral cross-plates pendent from the bottom of the axle-boxes, the inner member of each of the yokes being slotted in the direction of its length, both slots registering, equalizing-bars passing through said slots and resting on said plates, springs on the equalizing-bars, and the said frame on said springs, substantially as described.

5. The combination, in a truck, of the wheels, axles, and axle-boxes, of the horizontally-apertured lugs depending from each of the axle-boxes, a bottom cross-plate 14 extending between the sides of the lugs, equalizing-bars supported on said cross-plate, springs on said bars, and a truck-frame on said springs, substantially as described.

6. In a car-truck, the combination with the frame having axle-box yokes or pedestals, of axle-boxes in the yokes, the inner members of each of the yokes being slotted in the direction of their length, equalizing-bars passing through said slots and supported on the axle-boxes, springs on said bars supporting said frame, and a strap about each of said slotted members and embracing said bars, substantially as described.

7. In a car-truck, the combination of the truck-frame comprising axle-box yokes and side bars extending between the yokes, axle-boxes in the yokes, slotted lugs integral with and pendent from the axle-boxes and having an integral cross-plate having a curved upper face and equalizing-bars disposed parallel with the side bars and supported by said lugs, and springs extending directly upward between the side and equalizing bars closely adjacent to the upper and lower portions of the yokes, substantially as described.

8. In a car-truck, the combination of the truck-frame comprising axle-box yokes and side bars extending between the yokes, axle-boxes in the yokes, slotted lugs integral with and pendent from the axle-boxes and having an integral cross-plate provided with a curved upper surface, each of the yokes having a pendent member provided with a slot registering with the slots in said lugs, equalizing-bars disposed parallel with the side bars, supported by said lugs and passing through the yoke-slots, and spiral springs extending upwardly between the side and equalizing bars closely adjacent the yokes, substantially as described.

9. In a car-truck, the combination with a frame having yokes for the axle-boxes, extensions from the yokes, of a pedestal tie-bar comprising a horizontal and upright web extending between and secured to the arms of the yokes, crossing the space between them, and the upright web secured to the truck-frame beyond said yokes, substantially as described.

10. In a car-truck, the combination with the truck-frame having axle-box yokes or pedestals and extensions thereon, of the angle-iron pedestal tie-bar, the upright and horizontal webs of which engage the angle of the inner arms of each of the pedestals, the upright web being continued past the pedestals and bent upwardly and connected to said extensions, substantially as described.

11. The combination in a truck, of the frame having yokes, said yokes comprising depending arms, straps having a lower cross-bar secured to said arms, and a pedestal tie-bar located between the straps and said arms, substantially as described.

12. The combination in a truck, of the frame having a slotted yoke member, a strap secured to said member having a lower stepped cross-bar, and an angle-iron pedestal tie-bar between said strap and said member and bearing against the angle thereof, substantially as described.

13. The combination, with the truck-frame having axle-box yokes or pedestals, the member of each of said yokes being slotted in the direction of its length, a bar extending through said slot, and a strap embracing the slotted portion of said member and the bar and secured to the former, substantially as described.

Signed in the city and county of Philadelphia, State of Pennsylvania, this 20th day of January, 1897.

JOHN A. BRILL.

Witnesses:
R. S. REED,
R. W. BROADBENT.